(12) United States Patent
Caldwell et al.

(10) Patent No.: US 12,395,080 B2
(45) Date of Patent: Aug. 19, 2025

(54) TURNKEY POWER SYSTEM WITH FLEXIBLE CONTROL OF CONFIGURABLE POWER STAGE

(71) Applicant: THE AEROSPACE CORPORATION, El Segundo, CA (US)

(72) Inventors: David J. Caldwell, Carlsbad, CA (US); Christopher H. Le, Chino Hills, CA (US); Selasi Etchey, Los Angeles, CA (US); Sunny Yu, Alhambra, CA (US); Michael A. Willhoff, Topanga, CA (US); Hung V. Ngo, Cypress, CA (US); Vien X. Vu, Huntington Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 173 days.

(21) Appl. No.: 18/123,678

(22) Filed: Mar. 20, 2023

(65) Prior Publication Data

US 2024/0322691 A1    Sep. 26, 2024

(51) Int. Cl.
*H02P 1/00* (2006.01)
*H02M 1/088* (2006.01)
*H02M 3/158* (2006.01)

(52) U.S. Cl.
CPC ......... *H02M 3/1582* (2013.01); *H02M 1/088* (2013.01)

(58) Field of Classification Search
CPC .............................. H02M 3/1582; H02M 1/088
See application file for complete search history.

(56) References Cited

U.S. PATENT DOCUMENTS

| | | | |
|---|---|---|---|
| 5,559,367 A | 9/1996 | Cohen et al. | |
| 7,951,642 B2 | 5/2011 | Sung | |
| 7,961,482 B2 | 6/2011 | Ribarich | |
| 8,012,586 B2 | 9/2011 | Extrand et al. | |
| 2010/0109632 A1 | 5/2010 | Kwan | |
| 2013/0043852 A1* | 2/2013 | Marsili | H02M 3/1588 323/283 |
| 2015/0014698 A1 | 1/2015 | Briere | |
| 2017/0104477 A1 | 4/2017 | Hughes et al. | |

(Continued)

FOREIGN PATENT DOCUMENTS

CN            113595410 A    *  11/2021

OTHER PUBLICATIONS

Pern, F. J., et al., "Diamond-Like Carbon Coatings as Encapsulants for Photovoltaic Solar Cells", 31$^{st}$ IEEE Photovoltaic Specialists Conference and Exhibition, Lake Buena Vista, FL, 2005, pp. 1-4.

*Primary Examiner* — Karen Masih
(74) *Attorney, Agent, or Firm* — One LLP

(57) ABSTRACT

Disclosed are example embodiments of a power system. The power system includes a half-bridge circuit. The half-bridge circuit includes a voltage input and at least one voltage output. The power system also includes an isolation interface, coupled to the half-bridge circuit. The power system includes control circuitry, coupled to the half-bridge circuit through the isolation interface, wherein the half-bridge circuit is configurable, and wherein the voltage input and the at least one voltage output of the half-bridge circuit are isolated from the control circuitry by the isolation interface.

18 Claims, 8 Drawing Sheets

(56) References Cited

U.S. PATENT DOCUMENTS

| | | | |
|---|---|---|---|
| 2017/0170739 A1* | 6/2017 | Chiang | H02M 3/01 |
| 2017/0194285 A1* | 7/2017 | Zhu | H01L 22/34 |
| 2018/0198393 A1* | 7/2018 | Wagoner | H02P 27/08 |

* cited by examiner

TURNKEY POWER SYSTEM WITH FLEXIBLE CONTROL OF CONFIGURABLE POWER STAGE

TECHNICAL FIELD

The disclosure relates generally to the field of power systems, and specifically and not by way of limitation, some embodiments are related to configurable power systems.

BACKGROUND

Programs endure long costly development cycles due to challenges with unique designs. Space qualified off-the-shelf power converters are gaining popularity to save time for simple demands but lack features for dynamic applications. Advancements in adaptive power tend to be hindered as engineers focus on narrow specialization, rather than leveraging technologies across disciplines, particularly with respect to power applications.

A need exists for an improved power system that addresses one or more issues with off-the-shelf power converters, for example.

SUMMARY

In one example implementation, an embodiment includes the use of multiple Gallium nitride (GaN) filtered half-bridges with isolated interfaces to form a turnkey power system with flexible control of a configurable power stage. The disclosed turnkey power system can offer more flexibility when compared to current custom power applications that have lengthy and costly development cycles.

Disclosed are example embodiments of a power system. The power system includes a half-bridge circuit. The half-bridge circuit includes a voltage input and at least one voltage output. The power system also includes an isolation interface, coupled to the half-bridge circuit. The power system includes control circuitry, coupled to the half-bridge circuit through the isolation interface, wherein the half-bridge circuit is configurable, and wherein the voltage input and the at least one voltage output of the half-bridge circuit are isolated from the control circuitry by the isolation interface.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

Aerospace's cohesive expertise enables a product for multiple power applications without hardware (HW) design or software (SW) programming. GaN (Gallium Nitride) transistors with low energy loss and high switching speed reduce filter and thermal demands that compensate the parts added for broad application. Advances in digital controllers result in high throughput and low power consumption to satisfy challenging applications. This product combines previous Aerospace IR&D lessons with new ideas.

An example embodiment may provide for quick insertion of space power electronics for satellites, e.g., small satellites. Some example embodiments may provide a device with an adaptable controller and configurable power stage for multiple applications without redesign of hardware or code. Some example devices may include both hardware and software in the implementation.

It has been determined that it is very challenging to balance flexibility and performance of emerging technologies in a practical solution. In some embodiments, these difficulties may be overcome using digital power control and Gallium Nitride (GaN) power stages that may yield improvements in size (e.g., smaller relative to some previous devices), weight (e.g., lower weight relative to some previous devices) and power (e.g., higher power for a given size and/or weight relative to some previous devices). Some example embodiments may include a flexible digital power controller with a configurable GaN power stage.

Figure 1:
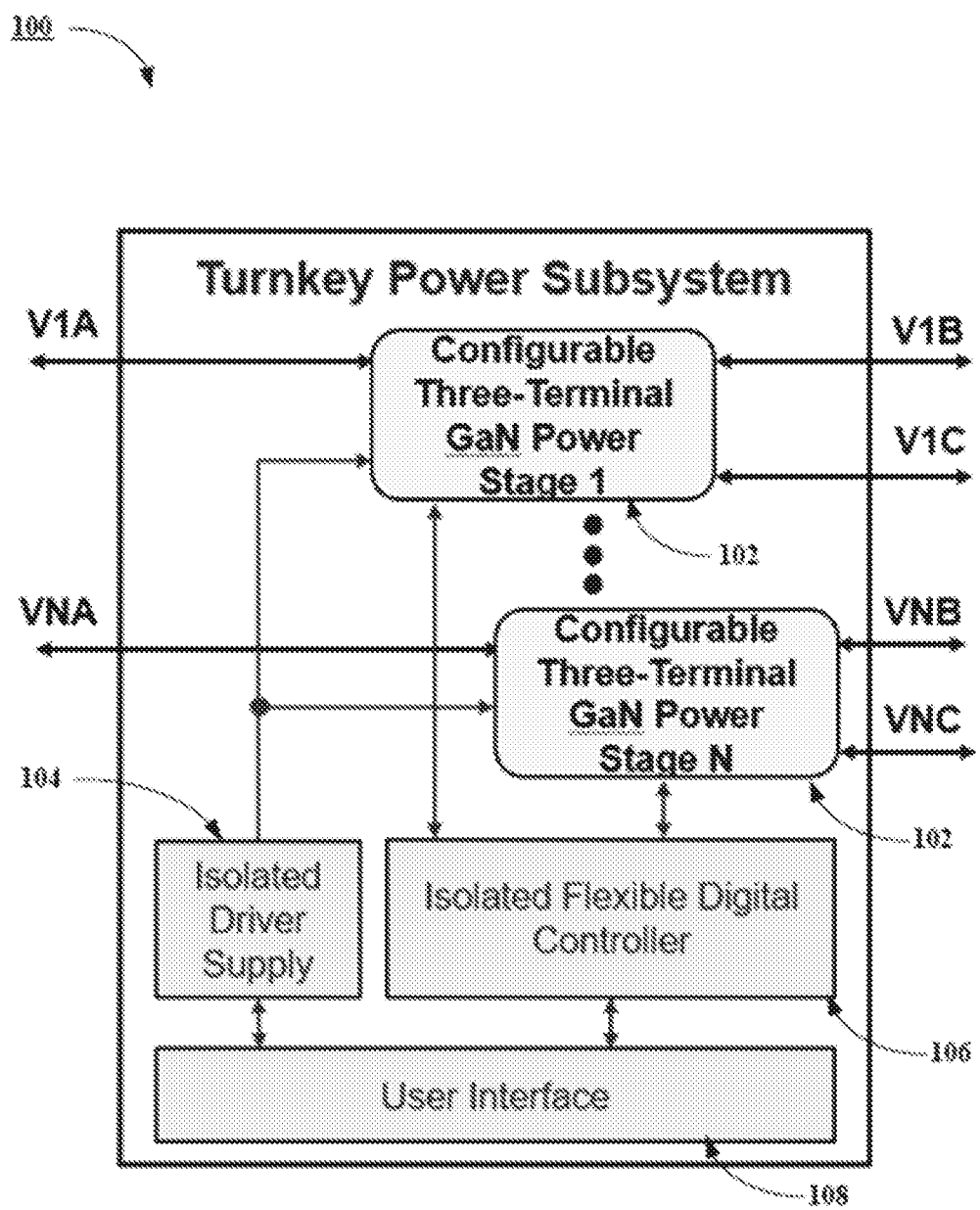
FIG. 1 is a block diagram illustrating a broad application with flexible control of configurable three-terminal GaN power stages in accordance with the systems and methods described herein.

FIG. 1 is a block diagram illustrating a broad application with flexible control of configurable three-terminal GaN power stages in accordance with the systems and methods described herein. The block diagram illustrates an example turnkey power subsystem 100. The example turnkey power subsystem 100 includes a configurable three-terminal GaN Power stage 102. The configurable three-terminal GaN Power stage 102 may be one stage (e.g., stage 1) of many stages (e.g., N stages) as indicated in FIG. 1. Additionally, the example turnkey power subsystem 100 includes an isolated driver supply 104, isolated flexible digital controller 106, and a user interface 108.

In an example embodiment, power systems 100 may transfer energy from a source (V1A ... VNA, V1B ... VNB, V1C ... VNC) to a load (V1A ... VNA, V1B ... VNB, V1C ... VNC). The configurable three-terminal GaN power stages 102 in the turnkey power subsystem 100 may be switching converters that provide efficient energy transfer. Two power switches allow bidirectional operation for interchangeable source and load (e.g., V1A to V1B, V1B to V1A, VNA to VNB, VNB to VNA, V1A to V1C, V1C to V1A, V1C to V1B, V1B to V1C, or any other combination.). The power switch (configurable three-terminal GaN power stages 102) states may be filtered to average the conduction duty ratio for selectable levels of voltage and current conversion. In an example embodiment, configuration may be accomplished by user selected connection of the three-terminal GaN power stages 102 in the turnkey power subsystem 100 without hardware modification of internal circuitry. Applications include independent, parallel, series or complementary configurations of power stages.

Power controllers may automatically adjust the duty ratio of power switches to provide selectable voltage and current conversion of filtered power stages through a feedback control loop. The flexible digital controller 106 in turnkey power subsystem 100 may enable a broad range of applications to be satisfied through pre-programmed options that may enable users to select from multiple control algorithms. Users can adjust operational parameters for the selected control algorithm to customize applications without reprogramming software or firmware code.

Interface signals from controller to power stages may typically duty ratio commands commonly referred to as pulse width modulation (PWM). Interface signals from power stages to controller may typically feedback signals including voltage and current sensing through analog to digital converters (ADC). The electrically isolated interfaces in turnkey power subsystem 100 may enable configuration of an array of power stages independent of ground reference for a broad range of voltage and current system demands through modularity. An array of turnkey power subsystems may be applied in a system with independent controllers or communicating controllers. Serial data communication through digital isolators is an example of controller communication within a system, in some embodiments.

The isolated driver supplies provide energy for control of power switch conduction. Typical driver supply 104 may use capacitive charge pump circuits that may be dependent on ground reference and less than 100% duty ratio. The isolated driver supply 104 in turnkey power subsystem 100 may enable ground independent reference and 100% duty ratio to satisfy a broad range of applications.

The user interface 108 for power stages may typically allow adjustment of voltage conversion levels in a single application. The user interface 108 in the turnkey power subsystem 100 may allow selection of control algorithms and operational parameters for configurable power stages with isolated interfaces to satisfy a broad range of applications. The user interface 108 can be pin selectable, digital communication or graphical user interface (GUI).

An example embodiment, as illustrated in FIG. 1, may include a turnkey power subsystem. Some embodiments may use multiple GaN filtered half-bridges with isolated interfaces to form a turnkey power system with flexible control of a configurable power stage. The disclosed turnkey power system can offer more flexibility when compared to current custom power applications that have lengthy and costly development cycles.

Some example embodiments may use GaN. For example, GaN transistors may be smaller in size to similarly functioning transistors of other types. Additionally, GaN transistors may be high efficiency with fast switching and low-loss conduction, e.g., as compared to some similarly functioning transistors of other types.

Some example embodiments may include interface isolation to broaden the range of applications that the power subsystem may be used in. For example, interface isolation may be provided by configurable three-terminal GaN power stages in accordance with the systems and methods described herein.

Some example embodiments may include configurable one or more three-terminal power stages for multiple energy conversion topologies. Again, for example, configurable three-terminal GaN power stages may be used in accordance with the systems and methods described herein.

Some example embodiments may include flexible control that may adapt to various applications. For example, the flexible control may be provided by one or more of the isolated driver supply 104, the isolated flexible digital controller 106, and the user interface 108.

The control circuitry may be coupled to the configurable three-terminal GaN Power stage 102 through an isolation interface. For example, the isolated driver supply 104 may power the switch drivers of the configurable three-terminal GaN Power stage 102 and be isolated from the flexible digital controller 106.

The isolated flexible digital controller 106 may control the configurable three-terminal GaN Power stage 102. The digital control may also be coupled to the configurable three-terminal GaN Power stage 102 through an isolation interface.

The user interface 108 may provide an intuitive user interface that may ease the generation of custom applications. For example, a feature set within the user interface may enable new and useful quick-turn power control applications.

Figure 2:
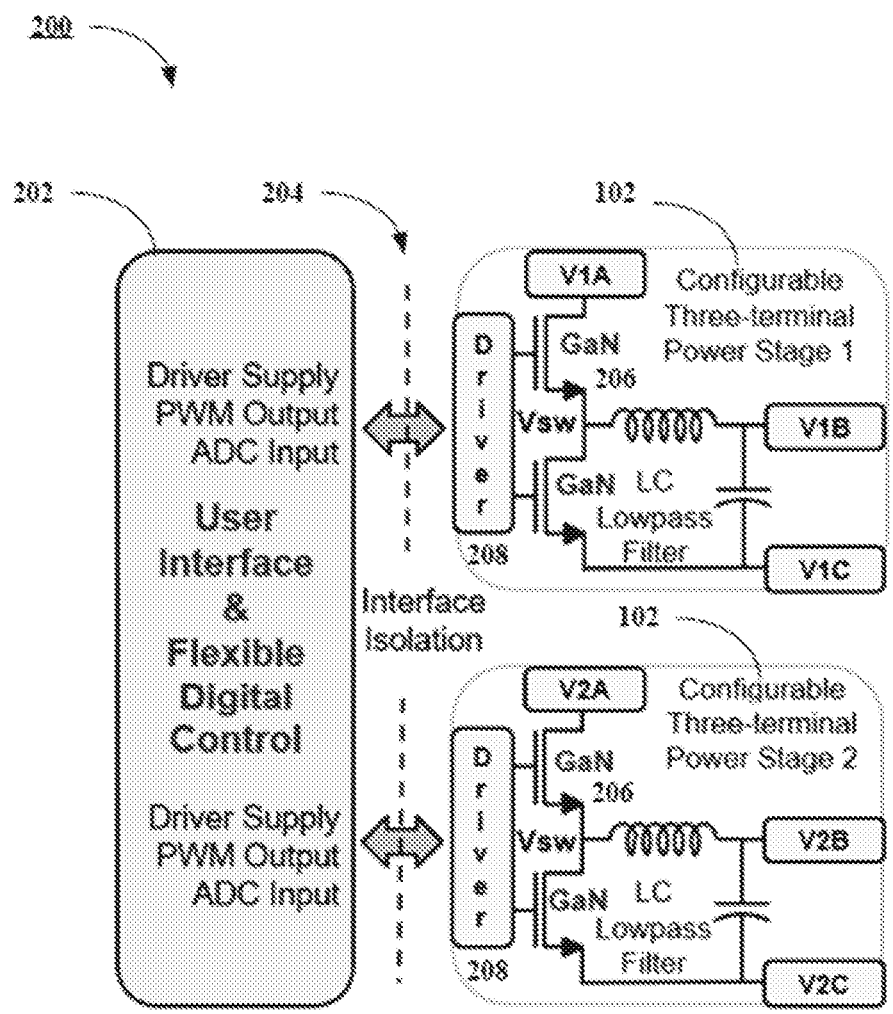
FIG. 2 is another block diagram illustrating a broad application with flexible control of configurable three-terminal GaN power stages in accordance with the systems and methods described herein.

FIG. 2 is another block diagram illustrating a broad application with flexible control of configurable three-terminal GaN power stages in accordance with the systems and methods described herein. The block diagram illustrates another example of the turnkey power subsystem 200. The example turnkey power subsystem 200 includes configurable three-terminal GaN Power stages 102 and control circuitry 202. The control circuitry 202 may include the isolated driver supply 104, the isolated flexible digital controller 106, and the user interface 108, as illustrated in FIG. 1. The control circuitry 202 may be isolated from the configurable three-terminal GaN Power stages 102 through an isolation interface 204.

The configurable power stages 102 in the turnkey power subsystem 100 may include two switches (GaN filtered half-bridges 206) in series with an inductive and capacitive (LC) filter at the intermediate point to form a three-terminal device referred to as a half-bridge converter. The two switches (GaN filtered half-bridges 206) may enable bidirectional current flow for interchangeable source and load. Rearranging source and load may enable voltages to be decreased (e.g., step-down), increased (e.g., step-up) or have polarity inverted with an opposing change in current. Filtering averages the duty ratio of the two switches for user selectable and controller adjustable voltage and current levels in each power stage. The isolated interfaces (e.g., in 202) may enable the power stages to be configured for independent, parallel, series, or complementary energy transfer. While GaN is the semiconductor technology considered advantageous for small and efficient power switches, in some embodiments, other options include, but are not limited to metal oxide semiconductor field effect transistors (MOSFET), insulated gate bipolar transistors (IGBT), silicon carbide (SiC) transistors, or any other appropriate transistor type.

An example embodiment may include GaN filtered half-bridges 206 with isolated interfaces. For example, the GaN filtered half-bridges 206 may be coupled to the control circuitry 202 through drivers 208 and the isolation interface 204. In an example embodiment, the isolation interface 204 may include interface isolation for full duty cycle conduction and a variety of connections.

An example embodiment may include independent, parallel, series, or complementary connected stages.

Figure 3:
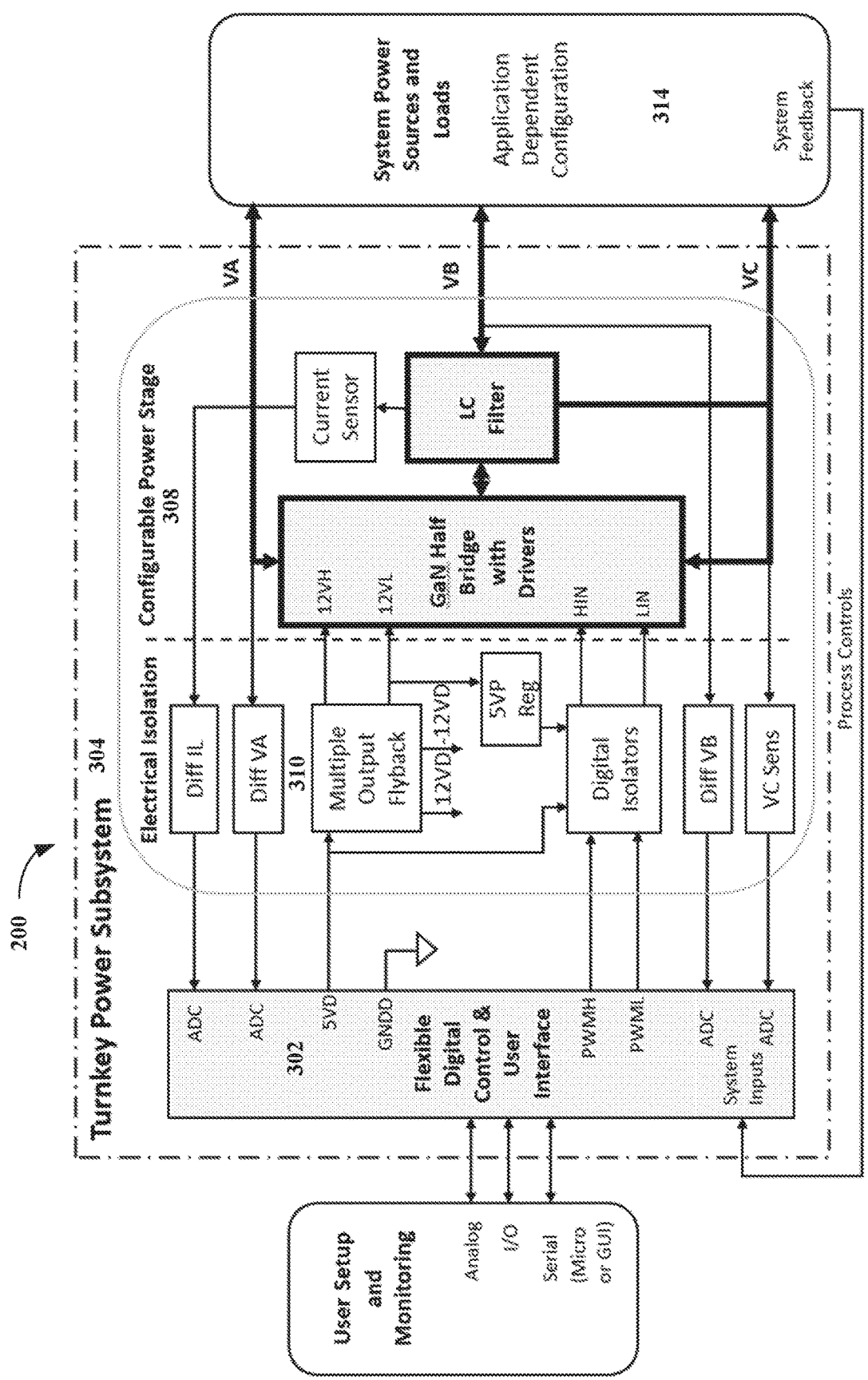
FIG. 3 is another block diagram that provides implementation details for one of multiple embodiments of the turnkey power subsystem 200.
Figure 6:
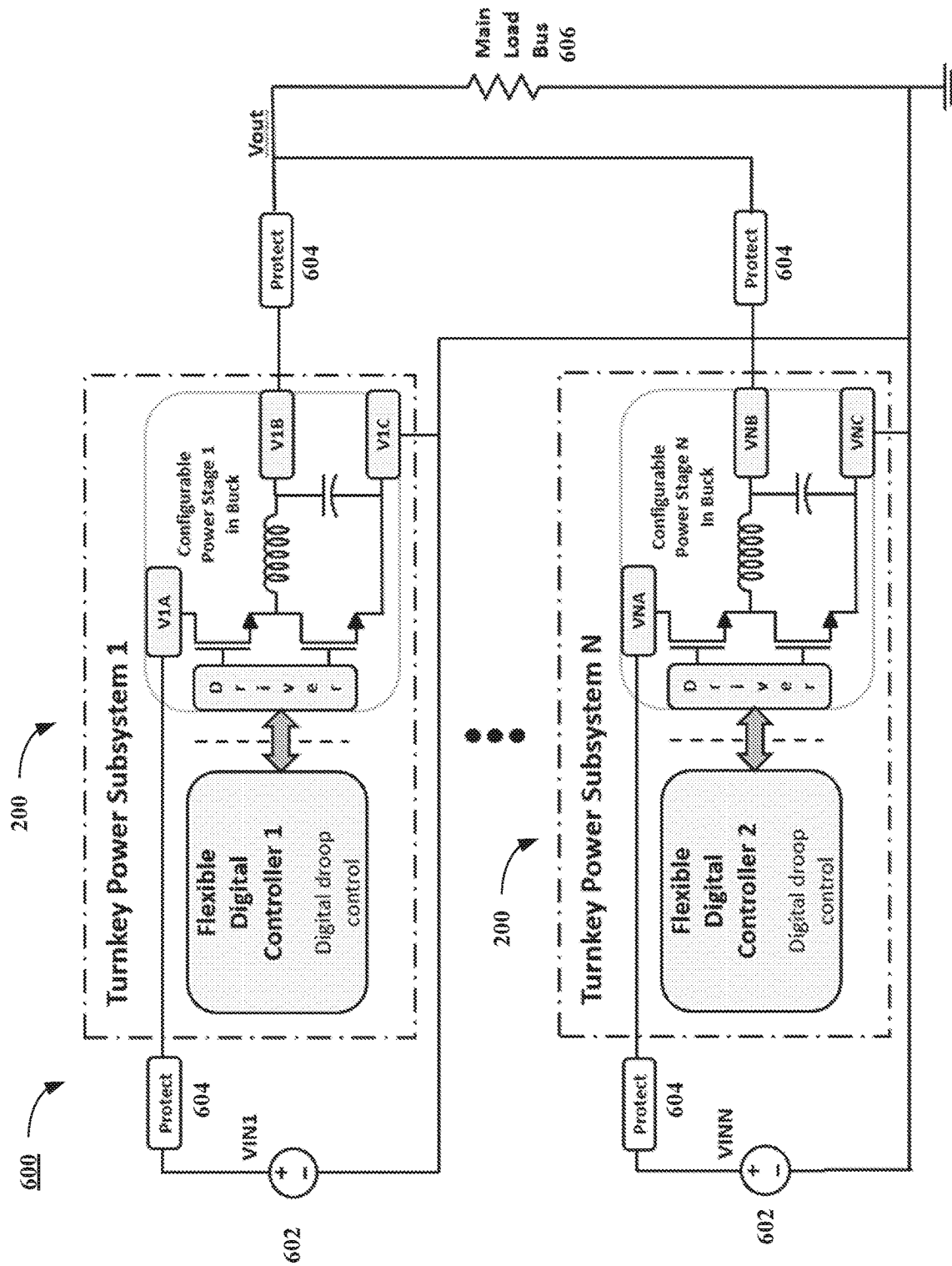
FIG. 6 is a diagram illustrating an example embodiment of independently controlled parallel operation through digital droop regulation that utilizes complementary power stages in accordance with the systems and methods described herein.

FIG. 3 is another block diagram that provides implementation details for one of multiple embodiments of the turnkey power subsystem 200. One example configurable power stage is illustrated although a multitude of modular power stages may be connected by the user to transfer energy from power source to load to satisfy a variety of unique applications, e.g., as illustrated in FIG. 6. The flexible digital controller 106 (within the flexible digital controller and user interface 302) may enable a multitude of control algorithms and operational parameters to be selected through the user interface 108 (also within the flexible digital controller and user interface 302) to satisfy a variety of unique applications. The user interface 108 may enable setup of the turnkey power subsystem that may then be optional during autonomous operation of the flexible digital controller 106. The flexible digital controller 106 may have inputs for system feedback signals in process control applications. Electrical isolation 304 between the flexible digital controller 106 (within the flexible digital controller and user interface 302) and configurable power stage 308 is comprised of the isolated driver supply and the isolated signal interfaces. The electrical isolation is illustrated on the power stage for modularity considerations although isolation may be implemented anywhere within the turnkey power subsystem 200.

The isolated driver supply may be a flyback switching converter 310 to provide low level power to auxiliary circuits with a plurality of transformer windings for multiple isolated output voltages. Low voltage input for the flyback converter 310 may be provided at the user interface or derived from the system power source. Voltage output 12VL to the lower switch driver may enable the power stage reference VC to operate independently of the digital controller ground GNDD. Voltage output 12VH to the upper switch driver enables 100% duty ratio operation of power switches. Voltage outputs 12VD and −12VD referenced to digital controller GNDD provide power for high common-mode differential amplifiers to isolate power stage feedback signals including voltages VA to VC, VB to VC and inductor current IL. VC to GNDD sense may be a simple resistive divider. Alternatives to isolating current signals include, but are not limited to magneto resistive, hall effect or transformer sensors. Alternates to differential amplifiers for voltage sensing, include but are not limited to galvanic analog isolators or an ADC referenced to VC that converts analog feedback signals to digital data transferred by digital isolators. The flexible digital controller outputs duty ratio PWML to lower power switch and PWMH to upper power switch are transferred through the digital isolators powered by 5VD referenced to GNDD in the digital controller and 5VP referenced to VC in the power stage.

Electrically isolating the digital controller from the power stages is advantageous, even when both are referenced to same return path, to minimize control problem due to feedback errors associated with voltage drops and system transients in the power return. The electrical isolation is accomplished with small, common, low power parts that adds minimal burden to size, weight, and power (SWaP). Overall cost and schedule can be reduced by enhancing design robustness and minimizing test problems with electrical isolation.

The illustrated example of FIG. 3 may also include a user setup and monitoring block 312, coupled to the flexible digital controller and user interface 302. The user setup and monitoring block 312 may communicate with the flexible digital controller and user interface 302 using analog signal lines, serial communication lines, or any other input/output signaling. The user setup and monitoring block 312 may allow a ser to set up the flexible digital controller and user interface 302, as well as monitor the flexible digital controller and user interface 302 operation.

Additionally, the illustrated example of FIG. 3 may also include a system power sources and loads block 314, which illustrates example connections from system power, e.g., VA, VB, VC to loads, and/or from system power sources to the system. VA, VB, and VC may be bidirectional. Alternatively, one or more of VA, VB, and VC may provide an output voltage, and one or more of VA, VB, and VC may be used to provide an input voltage. For example, VA may be an input and VB and VC may be outputs. VA may be an output and VB and VC may be inputs. It will also be understood that VA, VB, and VC are used as examples, more than three voltage lines or fewer than three voltage lines may be connected between the turnkey power subsystem 200 and the system power sources and loads block 314.

Figure 4:
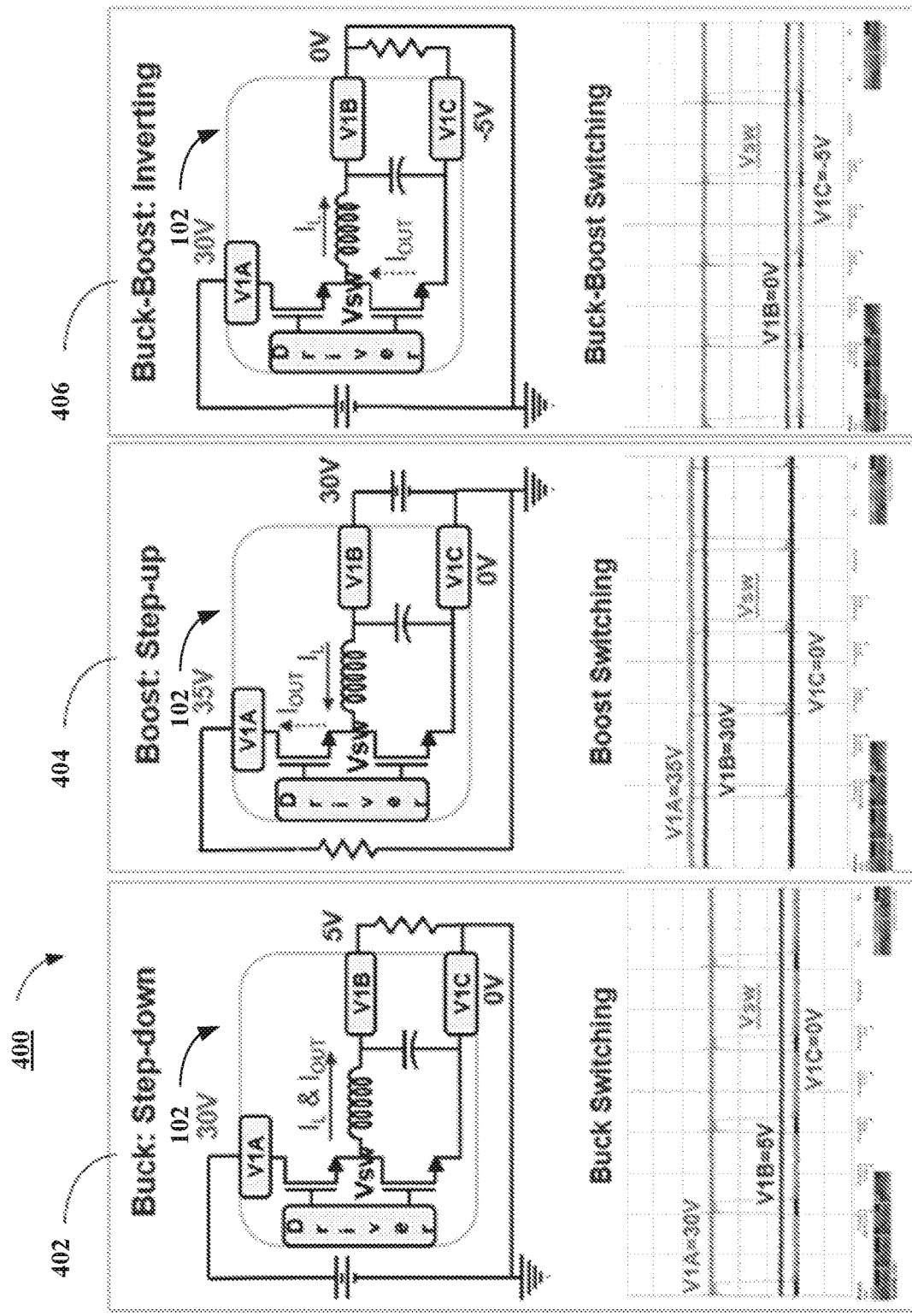
FIG. 4 is a block diagram illustrating configurable three-terminal GaN power stages in buck, boost, and buck-boost configurations in accordance with the systems and methods described herein.

FIG. 4 is a block diagram illustrating configurable three-terminal GaN power stages in buck, boost, and buck-boost configurations 400 in accordance with the systems and methods described herein. An example embodiment may include buck (step down) 402, boost (step up) 304, or buck-boost (inverting) 406. Some examples may be configured for buck-or-boost (step up or down), full-bridge (bipolar voltage & bidirectional current) and three phase (motor control or power distribution).

An example of complementary power stages is the buck-or-boost converter with two power stages configured in series. The first power stage may be configured as buck and the second may be configured as boost. The load voltage may be stepped up, stepped down, or equal to the source. The flexible digital controller may adjust switch duty ratio of the power stages for user selectable power conversion over a broad range of operation.

Figure 5:
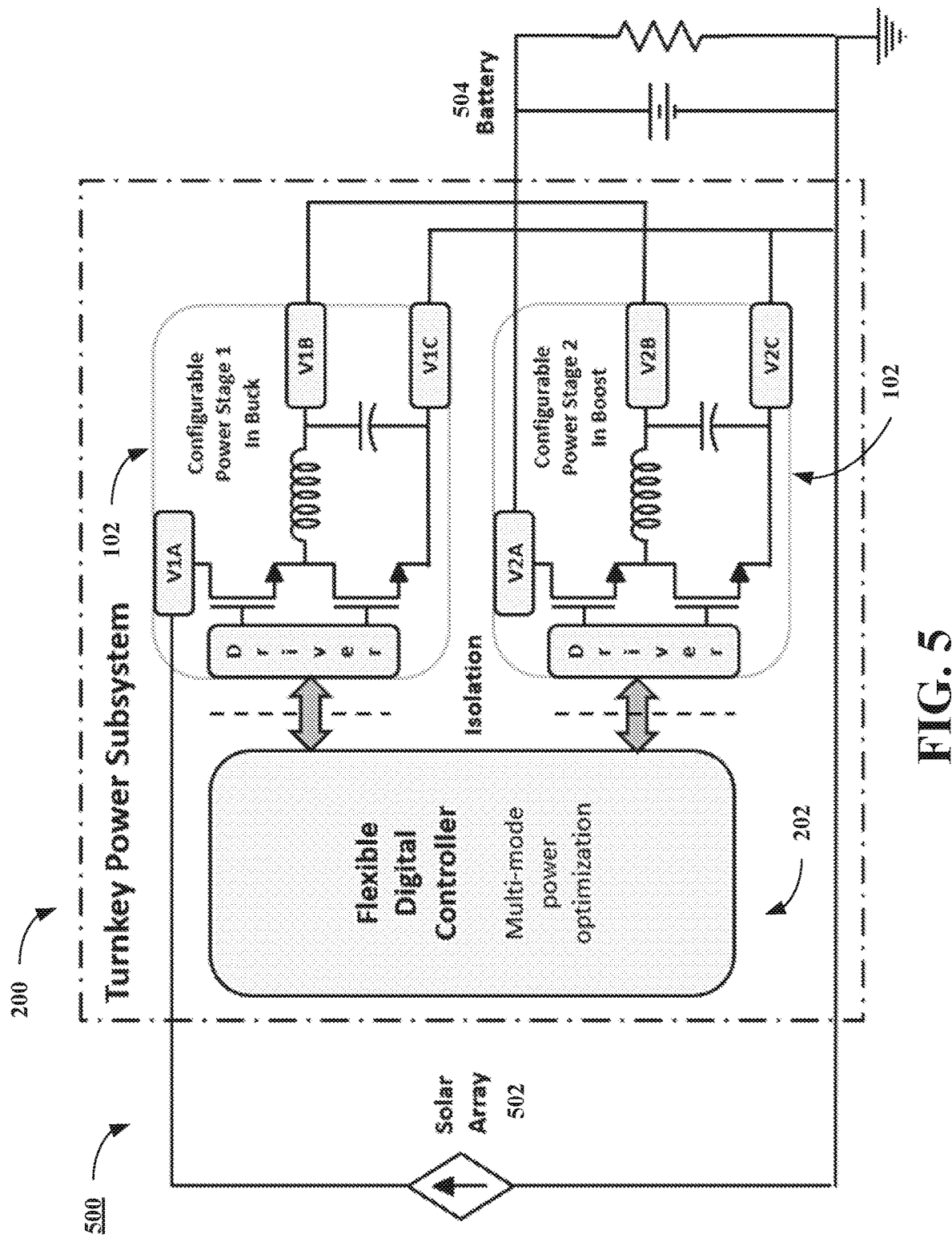
FIG. 5 is a diagram illustrating an example application of a buck-or-boost application that automatically adjusts operation to optimize power transfer from solar source to battery load under time varying conditions in accordance with the systems and methods described herein.

An example application of buck-or-boost application 500 is illustrated in FIG. 5 that automatically adjusts operation to optimize power transfer from solar source to battery load under time varying conditions. The isolated driver supply enables 100% duty ratio for full conduction of the upper switches in both power stages to enable efficient direct energy transfer (DET). The advantage of DET is decreased power dissipation by eliminating switching losses and reducing overhead power for switch drivers and digital controller set to lower clock frequency. The flexible digital controller may periodically select buck then boost operation to determine if extra solar power availability at a voltage different than the battery exceeds switching and overhead losses. The flexible digital controller automatically adjusts power stage operation for maximum power delivery over time varying conditions through multi-mode power optimization control.

An example embodiment may include a reduced size, weight, and power (SWaP) with GaN switches as compared to some systems using other types of transistors. An example embodiment may include a flexible easy-to-use digital controller. An example embodiment may regulate voltage, current, power, or external parameter.

An example embodiment may include an adaptive nonlinear control through load interrogation. An example embodiment may include an independently controlled parallel operation through digital droop regulation. An example embodiment may include multi-mode power optimization. An example embodiment may include user interface options without programming.

An example embodiment of the user interface that enable users to select from multiple pre-programmed control loop algorithm options and operational parameters that includes, but is not limited to conventional PID, adaptive nonlinear control, digital droop regulation and multi-mode power optimization.

FIG. 5 is another block diagram illustrating a broad application with flexible control of configurable three-terminal GaN power stages in accordance with the systems and methods described herein. The block diagram 500 illustrates another example of the turnkey power subsystem 200. The example turnkey power subsystem 200 includes configurable three-terminal GaN Power stages 102 and control circuitry 202. The control circuitry 202 may include the isolated driver supply 104, the isolated flexible digital controller 106, and the user interface 108, as illustrated in FIG. 1. The example illustrated in FIG. 5 may receive power from a solar array 502 (or other power source) and store power in a battery 504 or other energy storage device.

An example embodiment of independently controlled parallel operation through digital droop regulation 600 is in FIG. 6 that utilizes complementary power stages. Digital droop control can be applied to multiple turnkey power subsystems without controller interdependence. Each turnkey power subsystem provides a common output voltage that droops a small selectable amount within the voltage requirement that is proportional to output current for load sharing between subsystems. Adding protection such as a current limiting or circuit breaker device to inputs and outputs enables an N−1 fault-tolerant power system without potential for single point failures.

The digital droop control in flexible controller 1 calculates the duty ratio for configurable power stage 1 in buck. A first feedforward calculation compensates the output voltage V1B relative to VIC for variations in the input voltage VIA relative to VIC. The feedforward calculation is the desired setpoint for the output voltage divided by the measured input voltage. The duty ratio of the feedforward calculation results in the setpoint voltage at the output with no load. The output voltage may drop below the voltage requirement at rated output current due to internal impedances of the power stage. A second proportional calculation enables selectable compensation for output voltage droop at the output. The proportional calculation is the error voltage difference between setpoint output voltage and measured output voltage multiplied by proportional gain. The proportional result is added to the feedforward result to update the duty ratio of the power stage. The flexible digital controller in each turnkey power subsystem 1 to N has the same user setup for digital droop regulation.

The digital droop regulation advantages are: 1) elimination of controller interdependence enables parallel operation of multiple turnkey power subsystems for scalable load current with fault tolerance, 2) elimination of output voltage error integration in the controller enables current sharing without duty ratio windup that may induce instability, 3) elimination of ballast resistance in analog droop regulation is energy efficient. The digital droop regulation may be applied in buck, boost, buck-boost or buck-or-boost. The digital droop regulation has been demonstrated by test with three parallel buck power stages.

An example embodiment may include pin selectable (logic/resistor settings). An example embodiment may include serial or PC interface options. An example embodiment may include a modular system application of multiple subsystems.

The example turnkey power subsystem 200 of FIG. 2 may be coupled to any practical number (N) turnkey power subsystems 200, as illustrated in FIG. 6. The example turnkey power subsystem 200 may receive power from a voltage source 602 (VINN), e.g., through a protection circuit 804. Additionally, the example turnkey power subsystem 200 may provide power (Vout) to a main load 606 through protection circuits 604.

FIG. 5 also illustrates data for Power out of the converter, current from the battery, power at the load, and status. The computer window in the illustrated example also includes a block diagram of a power module and block diagrams for a battery charger and array sweep are also available when selected.

Figure 7:
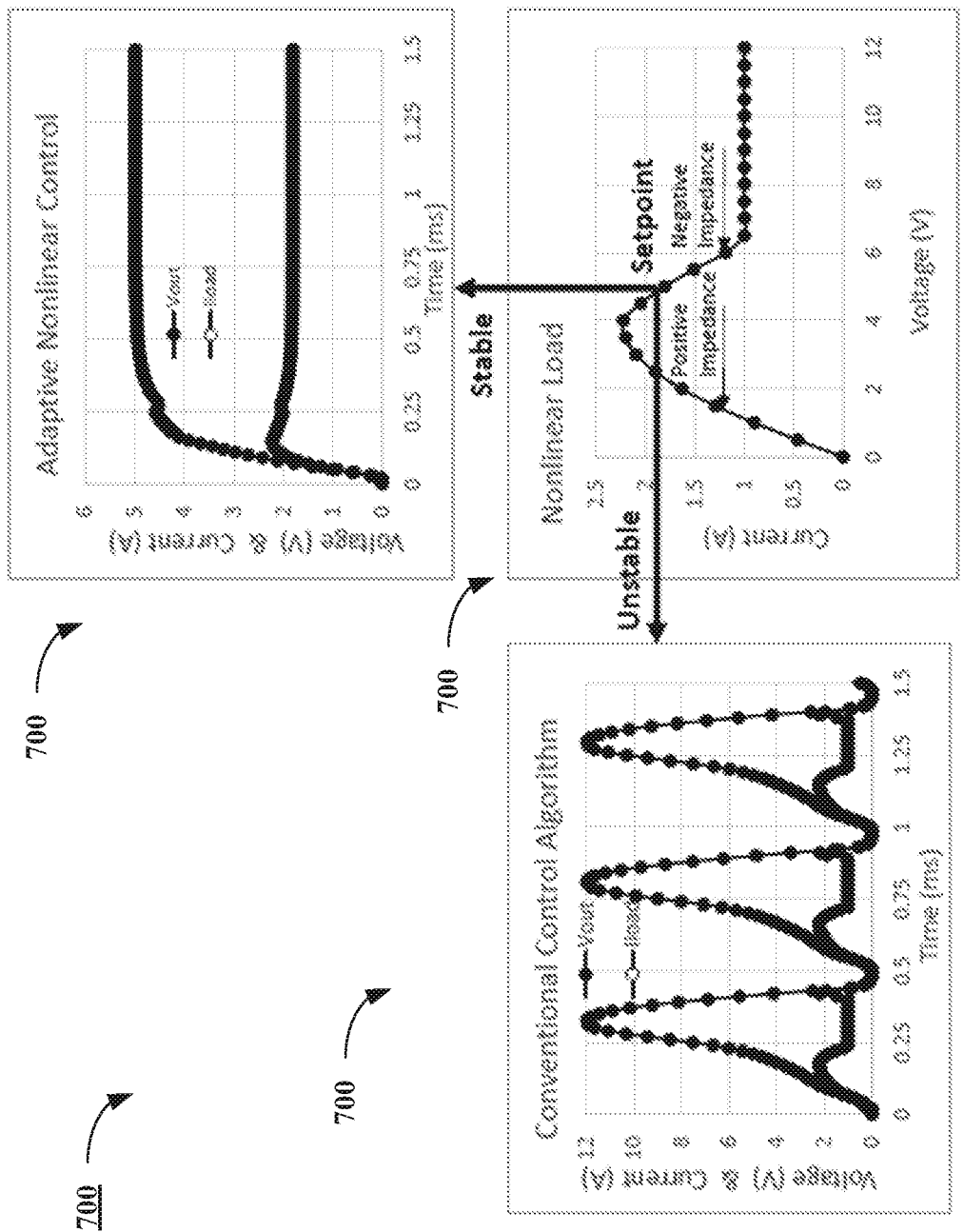
FIG. 7 is a diagram illustrating an output block for an example system in accordance with the systems and methods described herein.

FIG. 7 is a diagram illustrating an output block 700 for an example system in accordance with the systems and methods described herein. The outputs include graphs for adaptive nonlinear power control, as well as a graph for an example nonlinear load. The graphs for adaptive nonlinear power control are for voltage in volts or current in amps over time in milliseconds. The graphs for adaptive nonlinear power control includes a graph of voltage and current versus time for a conventional control algorithm 702, a graph of voltage and current versus time for adaptive nonlinear control 704, and a graph of current versus voltage 706. Adaptive nonlinear control is used for the illustrated example. The graph of the nonlinear load graphs current in amps versus voltage in volts.

The algorithm for adaptive nonlinear power control in the flexible digital controller employs load interrogation. On a periodic basis the selected control loop in the flexible digital controller updates the duty ratio of the configurable power stages. The delta values for load voltage and current are recorded by the controller that represents the change in value since the last PWM update to the power stage. The delta voltage is divided by the delta current to calculate the slope of load impedance. The load impedance calculation is used to scale a conventional control algorithm result, such as proportional, integral, differential (PID), to update the duty ratio of the power stages. The adaptive nonlinear control scales the gain and polarity of conventional algorithms to compensate nonlinear loads including negative impedance. A satellite electric propulsion system has negative impedance loads that are prone to instability with conventional algorithms. The adaptive nonlinear control has been demonstrated to be stable in simulation and test with nonlinear loads that include positive and negative impedance regions.

Figure 8:
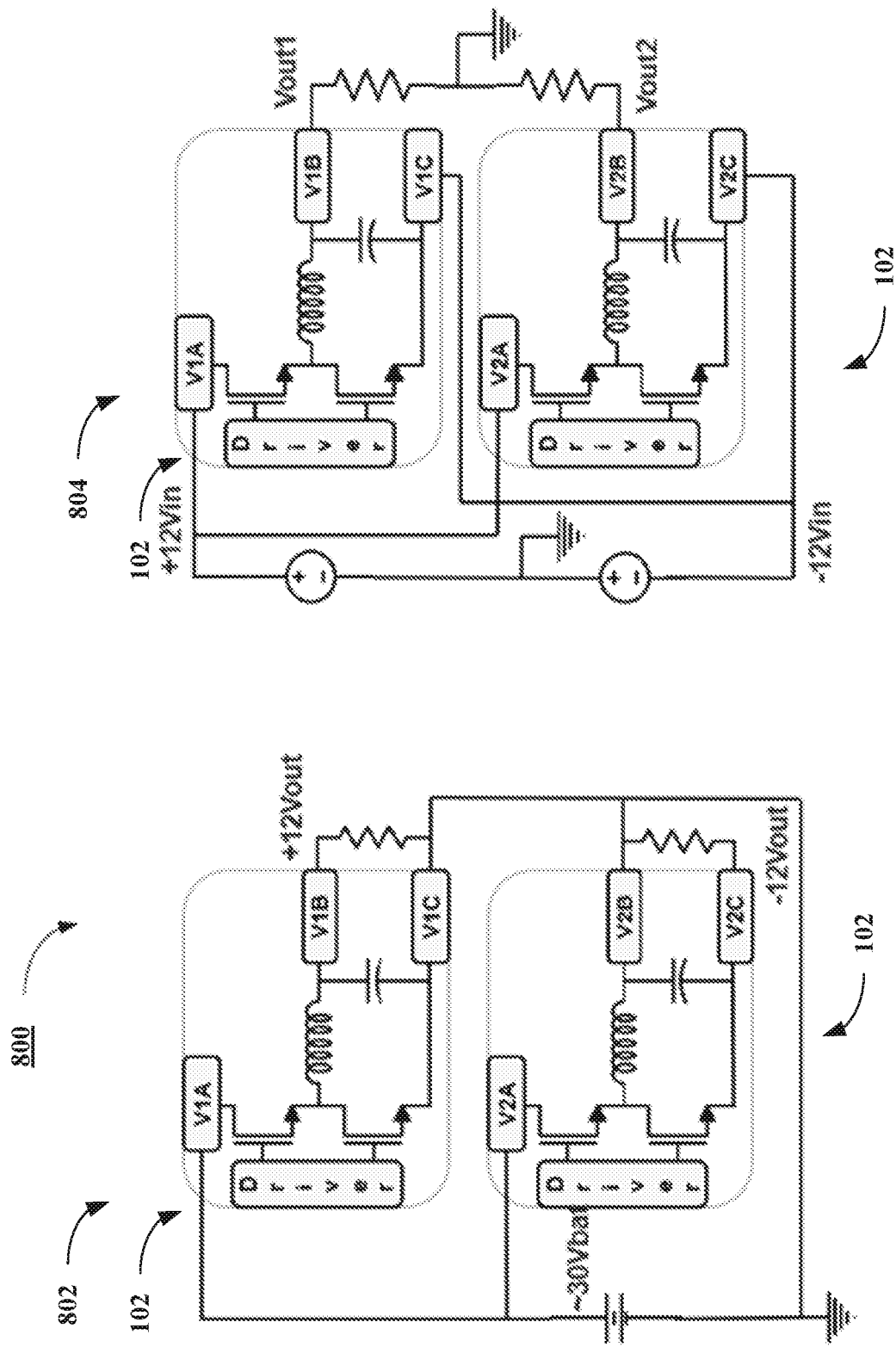
FIG. 8 is a diagram illustrating candidate applications, including a broad range of power control applications in accordance with the systems and methods described herein.

FIG. 8 is a diagram illustrating candidate applications, including a broad range of power control applications 800 in accordance with the systems and methods described herein. The left portion of the diagram 802 illustrates complementary power stages with the upper power stage in buck to generate +12V from battery at approximately 30V and the lower power stage in buck-boost to generate −12V from the same power source. The right portion of the diagram 1004 illustrates two variable secondary bipolar power stages. Additional variable secondary bipolar power stages could be added to a single flexible digital controller or independent turnkey power subsystems could be applied in the system. Example process control applications with variable bipolar voltages include but are not limited to: 1) automatic adjustment of positive voltage to supply power to digital devices for life extension by maintaining operation above observable error threshold, 2) automatic adjustment of negative bias to maintain constant RF power transmission, 3) automatic adjustment of bipolar Peltier drive for thermal control with heating or cooling, 4) automatic adjustment of bipolar actuator drive for motion control, 5) user selected bipolar signal to drive audio power amplifier. Additional user circuitry is expected for system parameter sensing in process control applications. The turnkey power subsystems simplify and expedite system design and with ready to apply flexible controllers and configurable power stages with isolated interfaces.

An example embodiment may include power conversion and distribution with load and bus protection without redesign. An example embodiment may include process controls, e.g., for RF power, actuator regulation, thermal control, solar peak power tracking, battery charging and sequential management.

An example embodiment may include efficient GaN filtered half-bridge power stages designed, built and tested. An example embodiment may include three terminal topology with isolated interfaces in various configurations verified. An example embodiment may include a digital high-speed closed-loop control demonstrated in a low power education kit. An example embodiment may include an initial Graphical User Interface (GUI) for intuitive application setup.

An example embodiment may include an educational simulation tool to expand digital power control knowledge developed. An example embodiment may include features through control software updates. An example embodiment may include process controls, arbitrary waveform generation, and/or power sequencing. An example embodiment may include hardware productization based on lessons from demonstration model.

An example embodiment may include advanced algorithms with nonlinear load interrogation and adaptive control.

In one example implementation, an embodiment includes the use of multiple Gallium nitride (GaN) filtered half-bridges with isolated interfaces to form a turnkey power system with flexible control of a configurable power stage. The disclosed turnkey power system can offer more flexibility when compared to current custom power applications that have lengthy and costly development cycles.

Disclosed are example embodiments of a power system. The power system includes a half-bridge circuit. The half-bridge circuit includes a voltage input and at least one voltage output. The power system also includes an isolation interface, coupled to the half-bridge circuit. The power system includes control circuitry, coupled to the half-bridge circuit through the isolation interface, wherein the half-bridge circuit is configurable, and wherein the voltage input and the at least one voltage output of the half-bridge circuit are isolated from the control circuitry by the isolation interface.

In an example embodiment, the half-bridge circuit comprises a GaN half-bridge circuit.

In an example embodiment, the half-bridge circuit comprises a filtered half-bridge circuit.

In an example embodiment, the isolation interface is configured to provide interface isolation for full duty cycle conduction over a variety of connections.

In an example embodiment, the half-bridge circuit comprises a plurality of half-bridge circuits.

In an example embodiment, the half-bridge circuit is configurable.

In an example embodiment, the half-bridge circuit is configured as a buck converter.

In an example embodiment, the half-bridge circuit is configured as a boost converter.

In an example embodiment, the half-bridge circuit is configured as a buck-boost converter.

In an example embodiment, the half-bridge circuit is configured as a buck-or-boost converter.

In an example embodiment, the half-bridge circuit is configured as a full-bridge.

In an example embodiment, the half-bridge circuit is configured as a three-phase motor control or power distribution system.

In an example embodiment, the half-bridge circuit includes a configurable three-terminal power stage.

In an example embodiment, the half-bridge circuit comprises a configurable three-terminal power stage and includes at least one of a set of drivers, a plurality of voltage inputs coupled together through a pair of Gallium Nitride (GaN) transistors and an LC lowpass filter.

In an example embodiment, the half-bridge circuit comprises a configurable three-terminal power stage that is configured as a buck converter.

In an example embodiment, the half-bridge circuit comprises a configurable three-terminal power stage that is configured as a boost converter.

In an example embodiment, the half-bridge circuit comprises a configurable three-terminal power stage that is configured as a buck-buck converter.

In an example embodiment, the control circuitry comprises digital control circuitry.

One or more elements or aspects or steps, or any portion(s) thereof, from one or more of any of the systems and methods described herein may be combined with one or more elements or aspects or steps, or any portion(s) thereof, from one or more of any of the other systems and methods described herein and combinations thereof, to form one or more additional implementations and/or claims of the present disclosure.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A power system comprising:
 a half-bridge circuit including a voltage input and at least one voltage output;
 an isolation interface, coupled to the half-bridge circuit; and
 control circuitry, coupled to the half-bridge circuit through the isolation interface, wherein the half-bridge circuit is configurable, and wherein the voltage input and the at least one voltage output of the half-bridge circuit are isolated from the control circuitry by the isolation interface,
 wherein the control circuitry is configured to implement adaptive non-linear control through load interrogation.

2. The power system of claim 1, wherein the half-bridge circuit comprises at least one of a Gallium nitride (GaN) half-bridge circuit, a filtered half-bridge circuit, and a plurality of half-bridge circuits.

3. The power system of claim 1, wherein the isolation interface is configured to provide interface isolation for full duty cycle conduction over a variety of connections.

4. The power system of claim 1, wherein the half-bridge circuit is configurable.

5. The power system of claim 4, wherein the half-bridge circuit is configured as one of a buck converter, a boost converter, and a buck-boost converter.

6. The power system of claim 1, wherein the half-bridge circuit is configured as a buck-or-boost converter.

7. The power system of claim 1, wherein the half-bridge circuit is configured as a full-bridge.

8. The power system of claim 1, wherein the half-bridge circuit is configured as a three-phase motor control or power distribution system.

9. The power system of claim 1, wherein the half-bridge circuit includes a configurable three-terminal power stage.

10. The power system of claim 1, wherein the half-bridge circuit comprises a configurable three-terminal power stage.

11. The power system of claim 10, further comprising at least one of a set of drivers, at least one voltage input coupled to a pair of voltage outputs through a pair of Gallium Nitride (GaN) transistors and an LC lowpass filter.

12. The power system of claim 1, wherein the half-bridge circuit comprises a configurable three-terminal power stage that is configured as a buck converter.

13. The power system of claim 1, wherein the half-bridge circuit comprises a configurable three-terminal power stage that is configured as a boost converter.

14. The power system of claim 1, wherein the half-bridge circuit comprises a configurable three-terminal power stage that is configured as a buck-buck converter.

15. The power system of claim 1, wherein the control circuitry comprises digital control circuitry.

16. The power system of claim 1, wherein the control circuitry further comprises a digital droop control.

17. The power system of claim 1, wherein the control circuitry further comprises a flexible digital controller having inputs for system feedback signals in process control applications.

18. The power system of claim 1, wherein the power system is coupled to a number (N) of other power systems.

* * * * *